United States Patent [19]

Guthry

[11] Patent Number: 5,509,657
[45] Date of Patent: Apr. 23, 1996

[54] POSITION INDICATOR DEVICE FOR GOLF CLUBS

[76] Inventor: Joe M. Guthry, 10716 E. Timberwagon Cir., Woodslands, Tex. 77380

[21] Appl. No.: 387,314

[22] Filed: Feb. 13, 1995

[51] Int. Cl.$^6$ .......................... A63B 57/00; A63B 69/36; G01C 9/28; G01C 9/36
[52] U.S. Cl. .............................. 473/241; 33/334; 33/373; 33/384
[58] Field of Search .......................... 273/162 B; 33/334, 33/305, 370, 371, 372, 373, 383, 389

[56] References Cited

U.S. PATENT DOCUMENTS

| | | | |
|---|---|---|---|
| 4,079,520 | 3/1978 | Davis | 273/162 B X |
| 4,934,706 | 6/1990 | Marshall | 273/162 B X |
| 5,174,572 | 12/1992 | Ho | 273/162 B |

*Primary Examiner*—William H. Grieb
*Attorney, Agent, or Firm*—Bush, Mosely, Riddle & Jackson

[57] ABSTRACT

A golf club positioning and position indicating device having a mounting base that is releasably attached to the shaft of a golf club below the handgrip of the club. A positioning head support for support and orientation of a positioning head which can be visually inspected by a golfer when addressing the golf ball in preparation for the intended golf stroke. The positioning head support is releasably received in specifically oriented relation by the mounting base to provide for simple and efficient assembly or disassembly of the positioning head relative to the mounting base. A spirit level support is connected in adjustable pivotal relation with the positioning head support and retains a circular spirit level of a dimension that can be easily visually inspected by a golfer holding the golf club at the ball addressing position. The spirit level has a crystal having orientation indicia thereon which enables a golfer to ascertain selective alignment of the bottom edge of the golf club head to enable accurate striking of the golf ball. The indicia further provides reference lines for orienting the positioning device with respect to the shaft of the golf club. The indicia permits selective orienting of the club head and face to "up", "down", "open" or "closed" positions to impart a controlled trajectory to the ball.

16 Claims, 2 Drawing Sheets

POSITION INDICATOR DEVICE FOR GOLF CLUBS

FIELD OF THE INVENTION

This invention relates generally to golf clubs, including wood and iron golf clubs such as are used for the recreational and professional playing of the game of golf. This invention also pertains to the need for accurate positioning of golf clubs, whether woods, irons or putter, to enable golfers to consistently achieve accurate golf shots. More specifically, the present invention concerns a position indicator device which is capable of being removably attached to the shaft of a golf club immediately beneath the handle grip portion thereof and which includes a spirit level and position indicia which permit a golfer to ascertain the position of a golf club when the golf club is positioned for addressing the ball and also permits the golfer to selectively orient the golf club to achieve selective striking of the ball for the purpose of hitting directionally controlled golf shots such as a hook or draw, a slice or fade or an elevationally oriented shot such as flat or high golf ball flight or trajectory.

BACKGROUND OF THE INVENTION

It is said that the "core of the game of golf" is having the striking face of each golf club square with the line of intended flight of a golf ball at the time of club impact with the ball. The present invention has as the most prominent of its features the provision of a device which can be easily attached to any golf club and which provides the golfer with a simple and efficient visual indication that the handgrip of the club and the striking face of the club are properly oriented so that the club head will be square with the line of flight at impact. In the playing of the game of golf various types of golf clubs are utilized, each having a shaft with a hand grip at its upper end and with a club head at its lower end. The club head can be a "wood" head enabling the club to be utilized for T-shots and long fairway shots or the club may take the form of an "iron" which is composed of metal in blade-like form with the head or blade defining an angulated grooved striking face which engages the ball to loft it to a desired trajectory and to impart a degree of underspin to the ball so that the ball may be landed in controlled fashion on a green or fairway surface. In many cases, it is desirable to provide a swing and ball striking capability of respective golf clubs so that the flight of the ball is selectively elevated to achieve the desired distance and is hit straight from the golfer's position to a target. In many cases however, it is desirable to impart a controlled flight to the ball, not only achieving appropriate elevation with respective golf clubs, but also achieving a degree of draw or fade to move the ball from right to left or left to right during its flight so that the landing position and characteristics of the golf shot will be controlled by the golfer. In some cases, extreme curvature of the flight of the ball is desired and a hook or slice of extreme curvature may be selectively employed by a golfer to negotiate obstacles and yet achieve landing of the golf ball in controlled fashion. These differently controlled golf shots can be achieved by controlled positioning of the feet of the golfer and the body position in relation to the intended flight of the ball and can also be achieved by controlled positioning of the golf club as it strikes the ball and controlled movement of the golf club during the period of club contact with the ball so that appropriate elevation and spin is imparted to the ball to achieve the desired results.

Since the shaft of the club is positioned in angular relation from the hands of the user to the surface on which the golf ball rests and projects from the golfer's position to a position forwardly of the golfer it is difficult, especially for a novice golfer, to determine the exact position of the golf club head when the ball is addressed or is struck by the club during the golf swing. Further, since the club head of both woods and irons is positioned in angulated relation to the shaft of the golf club, this factor adds even further to the inability of many golfers to accurately position the golf club so that the intended flight of the ball will result from that golfer's golf swing. It is not unusual for a golfer to feel as if the ball will go straight when struck, only to have the ball flight result in a hook or slice so that the flight of the ball carries it to an undesired location. It is therefore desirable in many cases for golfers, especially during practice sessions, to have the capability to visualize proper positioning of the golf club in relation to the ball when the ball is being addressed so that the resulting golf shot will achieve intended directionally controlled flight of the ball from the golfer's position to the target and land on the target in a desired manner, i.e. with underspin to stop, with minimal underspin to run or bounce to the target.

Although much of the golf practice activities that are done occur at driving ranges so that golfers can visualize the flight of the ball and make adjustments and corrections to hopefully achieve more consistency in setup, alignment, club positioning and swing, when the golfer is practicing alone it is difficult for that golfer to personally visualize this positioning of the golf club. Consequently, many golfers, even those having considerable experience, often misposition the golf club relative to the golf ball, both when the ball is being addressed and when the ball is being struck. Golfers often compensate for this mispositioning so that the resulting flight of the ball may reach the intended target even though the flight of the ball to the target may not be desirable. When a golfer mispositions the golf club and then compensates for mispositioning, it is logical that muscle training so that the golf swing can become repetitive and yet achieve desired results, it is very difficult to achieve. Proper muscle training is accomplished by achieving proper positioning of the golfer in relation to the ball and the club in relation to both the golfer and ball, and then achieve a proper swing repetitively. When this is done over a long period of time, the golfer's swing becomes "grooved" and thus is naturally repeatable and thus the golfer's capability of striking the ball in repeated fashion with different clubs and achieving efficiently controlled flight of the ball to an intended target also becomes repetitive. It is desirable therefore to provide golfers with the capability of becoming visually aware when a golf club is properly positioned or when it is positioned for selective control of the flight of the ball to an intended target. When this can be accomplished efficiently the golfer can then repeat club positioning and swinging so that efficient muscle memory can be developed for consistently achieving proper positioning and swinging of a golf club.

SUMMARY OF THE INVENTION

It is therefore a principle feature of the present invention to provide a novel golf club positioning and position indicator device which may be used by golfers to ascertain the position of a golf club when a golf ball is being addressed.

It is also a feature of this invention to provide a novel golf club position indicator and positioning device that may be utilized by golfer's to achieve controlled positioning of a golf club so as to achieve selectively controlled flight of the ball from the golfer's position to an intended target.

It is another feature of the present invention to provide a novel golf club positioning and position indicator device having a spirit level that may be visualized when the golf club is positioned at ball address and which may be utilized by the golfer to correct the position of the golf club until desired positioning has been achieved.

It is another feature of the present invention to provide a golf club position indicator and positioning device having a spirit level and further having specific indicia thereon for correlation with the spirit level to thereby enable controlled positioning of the golf club by the golfer.

It is another feature of this invention to provide a novel golf club positioning and position indicator device that may be simply and efficiently attached to the shaft of a golf club immediately below the grip thereof and which may be effectively utilized by golfer's both during practice swinging activities and in actual play so that the golfer can achieve repetitive positioning and swinging of the club and thereby achieve appropriate muscle memory training so that the golfer's swing may be efficiently repeated.

Briefly, the various objects and features of the present invention are realized by the provision of a golf club positioning and position indicating device having a mounting base that is intended for releasable attachment to the shaft of a golf club at a suitable location at or below the handgrip of the club. Positioning head support means is provided for support and orientation of a positioning head means which can be visually inspected by a golfer at the time the golfer is addressing the golf ball in preparation for the intended golf stroke. The positioning head support means is releasably received in specifically oriented relation by the mounting base to provide for simple and efficient assembly or disassembly of the positioning head means relative to the mounting base. The positioning head means is defined by a spirit level support which is connected in adjustable pivotal relation with the positioning head support and which retains a circular spirit level of a dimension that can be easily visually inspected by a golfer holding the golf club at the ball addressing position. The spirit level is provided with an inspection crystal having orientation indicia thereon which enables a golfer to ascertain that the substantially straight bottom edge of the golf club head is oriented in horizontal manner to enable accurate striking of the golf ball. The orientation indicia further provides the golfer with the capability for accurately orienting the positioning device with respect to the shaft of the golf club. Even further, the indicia permits a golfer, during play or during practice, to selectively orient the club face or ball striking face of the golf club at a selected angle relative to the golf ball, such as is identified herein as "open" or "closed", to thus enable the golfer to impart a controlled trajectory or flight to the ball.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which.

DETAILED DESCRIPTION OF PREFERRED EMBODIMENT

Figure 1:
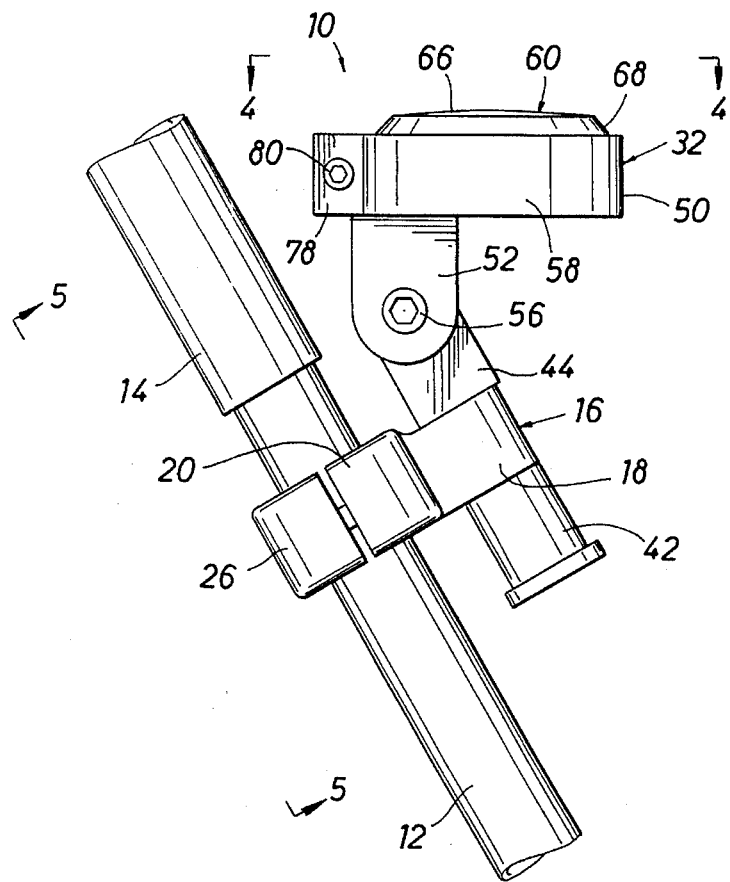
FIG. 1 is a partial elevational view of the shaft and handgrip of a golf club having the golf club positioning and position indicator device of the present invention in assembly therewith.
Figure 5:
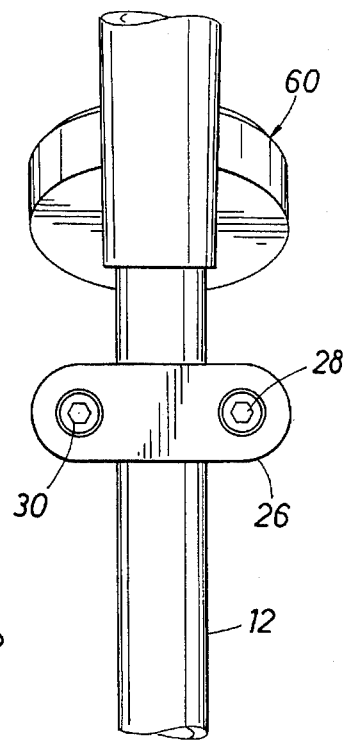
FIG. 5 is a bottom view of the golf club shaft and handgrip with the positioning and position indicating device of the present invention in assembly therewith.
Figure 6:
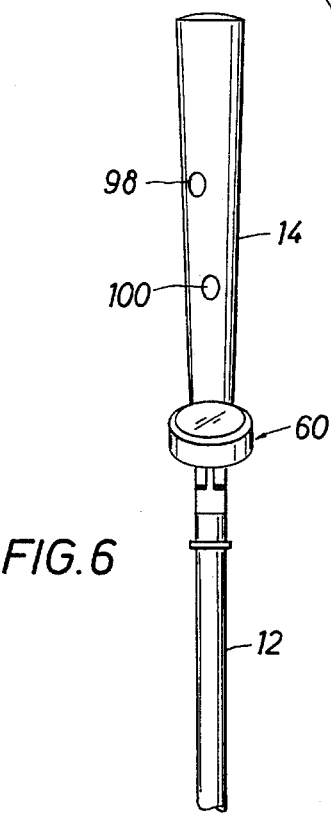
FIG. 6 is a pictorial illustration of the shaft and handgrip portion of a golf club with the position indicator and club positioning device of this invention in releasable assembly therewith and showing thumb positioning markers being positioned on the handgrip to thus enable the golfer to ensure accurate positioning of the hands in relation to the handgrip and thus consistent positioning of the hands in relation to the positioning device.
Figure 7:
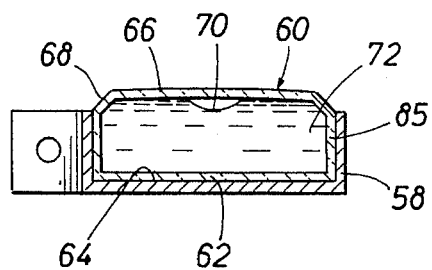
FIG. 7 is a sectional view of the positioning head and spirit level portion of the apparatus of FIG. 1.

Referring now to the drawings and first to FIG. 1 a golf club position indicating and positioning device constructed within the scope of the present invention is shown generally at 10 in releasable assembly with the shaft 12 and handgrip 14 of a conventional golf club. For secure but releasable attachment of the positioning device to the golf club means for mounting is provided, incorporating a mounting base shown generally at 16 having a mounting block 18 having an elongate clamping section 20 formed integrally therewith. The clamping section defines a generally semi-cylindrical central recess 24 which receives the golf club shaft 12. An elongate clamping block 26 is provided with a generally cylindrical recess which also receives the golf club shaft 12 and is secured to the clamping section of the mounting block by a pair of screws or bolts 28 and 30 as shown in FIG. 5. When in assembly with the shaft 12 the clamping section 20 and clamping block 26 are disposed in spaced relation as shown in FIG. 1, thereby defining sufficient standoff to enable the mounting screws or bolts to be tightened sufficiently to bind the mounting base in immovable relation with the golf club shaft 12. This feature also enables the mounting base to be selectively positioned along the length of the slightly tapered shaft 12 as suits the needs of the user.

It is desired to provide positioning means for visualization by a golfer while addressing a golf ball so that the golfer can ensure desired positioning of the golf club in relation to the ball and the intended flight of the ball. According to the present invention this feature is effectively achieved by a positioning head and head support assembly shown generally at 32, which is releasably supported in position controlled manner by the mounting base. The mounting block 18 defines a passage 34 of non-circular cross-sectional configuration, being preferably of rectangular cross-sectional configuration which receives a retainer pin 36 of corresponding non-circular cross-sectional configuration to thus provide for precise orientation of the positioning head assembly relative to the mounting base. The retainer pin 36 is provided with a threaded extremity 38 which is received by the internal threads 40 of a retainer nut 42. When the retainer nut is tightened on the threaded extremity of the retainer pin the positioning head assembly will be retained in properly oriented and fixed relation with the mounting base. The positioning head assembly is thus easily removed from the mounting base, such as for use of the golf club with only the mounting base secured to the golf club shaft, simply by manually unthreading the retainer nut from the threaded end of the retainer pin and by withdrawing the retainer pin from it's passage 34. In fact, the positioning head assembly may be either assembled to the mounting base or removed from the mounting base in only a few minutes time.

The retainer pin is fixed to and projects from a positioning head support element 44 having a rounded support extremity 46 provided with a pivot opening 48 therein. A positioning head 50 is provided having a pair of spaced support and positioning tabs 52 and 54 which define a space therebetween receiving the support extremity 46 in pivotally movable relation therein. The positioning tabs 52 and 54 define aligned pivot openings which receive a pivot element 56 that also extends through the pivot opening 48 of the head support element 44. Though it is appropriate for the positioning head to pivot relative to its support for selective positioning it is also desirable to secure the positioning head in substantially immovable relation to its positioning support after desired positioning thereof has been established. For this reason the pivot element 56 may conveniently take the form of a pivot bolt that can be tightened securely to restrain the positioning head support and the positioning tabs 52 and 54 in immovable relation.

The positioning head includes a generally circular case 58 which provides support for a circular spirit level shown generally at 60. The spirit level includes a liquid containing case 62 which is retained within a generally circular recess or receptacle 64 within the case 58 of the positioning head. The upper portion of the spirit level is defined by a generally circular crystal 66 having a bevelled outer periphery 68. The crystal is clear, thus enabling the user to visualize the position of an air bubble 70 that is present within the liquid that nearly fills the internal closed chamber 72 of the spirit level. The housing or case 58 of the positioning head is split as shown at 74 and defines a pair of spaced retainer tabs 76 and 78 which are forced toward one another by the force of a retainer bolt 80 that extends through aligned bolt holes 82 and 84 of the respective retainer tabs to establish friction gripping of the circular outer peripheral wall 85 of the spirit level. Though the spirit level may be frictionally retained in assembly with the housing 58 of the positioning head, it should be borne in mind that any other suitable means may be employed to retain the spirit level in immovable assembly within the positioning head. For example, the spirit level may be cemented within the housing receptacle of the positioning head and the friction retaining tabs 76 and 78 may be eliminated. The friction retention system however, permits simple replacement of the spirit level in the event it should become damaged and permits selective adjustment of the position of the spirit level if such adjustment is desired.

Figure 2:
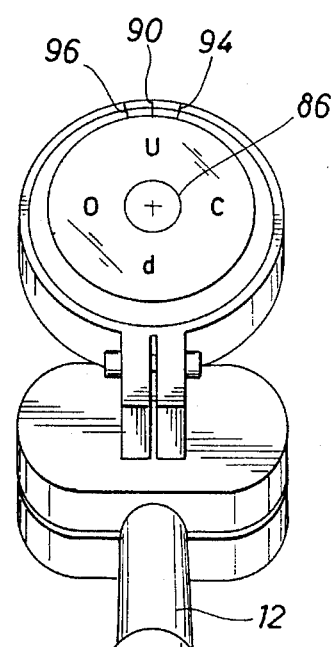
FIG. 2 is a partial isometric illustration of a golf club shaft and handgrip with the golf club positioning and position indicator device of this invention in assembly therewith and being in position for visualation by a golfer holding the golf club in position for addressing a golf ball.
Figure 4:
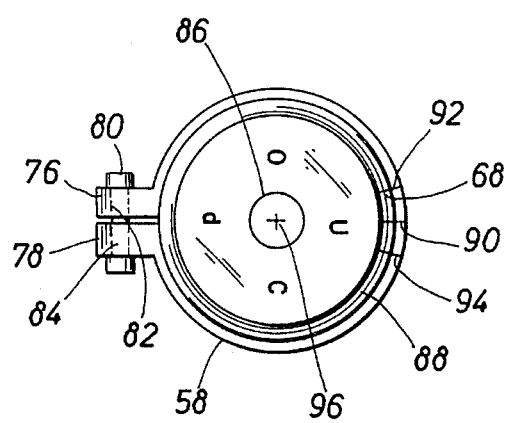
FIG. 4 is a partial plan view taken along line 4–4 of FIG. 1 and showing the spirit level portion of the positioning head together with the positioning indicia of the crystal thereof.
Figure 3:
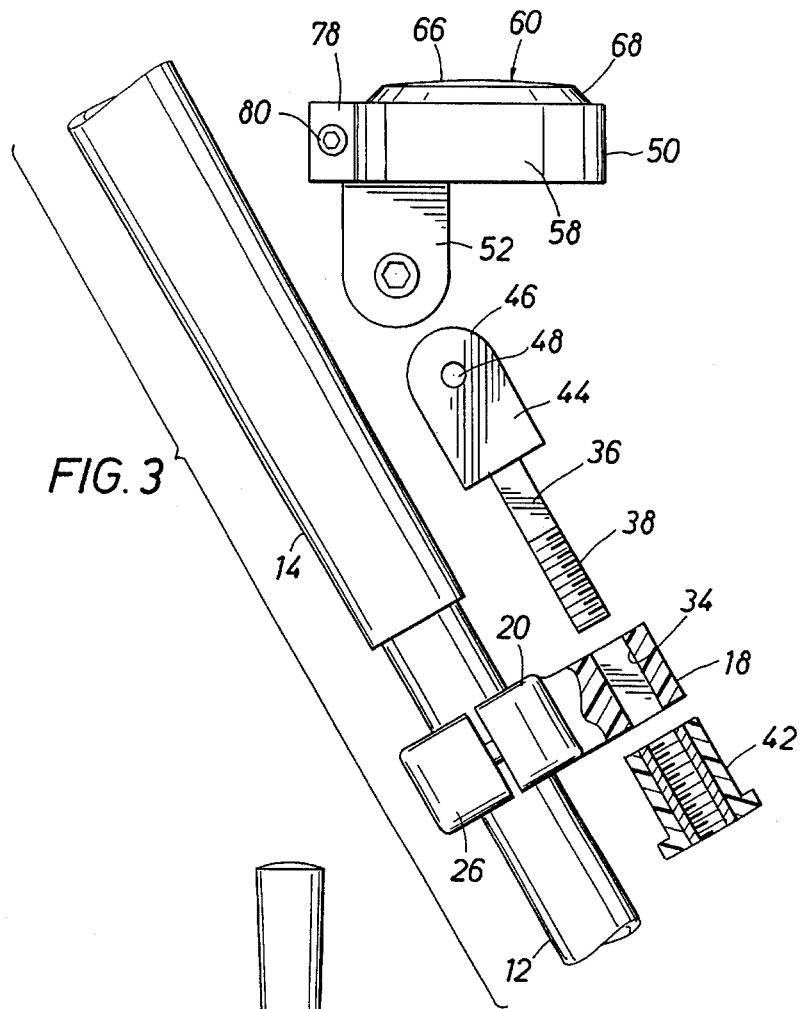
FIG. 3 is an exploded elevational illustration of the golf club shaft and handgrip with the mounting base of the golf club positioning and position indicator device of this invention in assembly therewith and showing the positioning head, positioning head support and head retainer being separated from the mounting base.

The flat upper surface of the crystal that is encompassed by the outer peripheral tapered portion 68, is provided with indicia that permits the golfer not only to ensure proper positioning of the golf club for hitting an optimum straight golf shot, but also to establish controlled positioning of the golf club when the ball is being addressed. The indicia may be provided on a decal that is adhesively attached to the crystal or the crystal itself may be provided with indicia markings that are engraved or otherwise permanently defined thereon. As shown in FIG. 2, the indicia defines an inner circle 86 of substantially the same circular dimension as the circular dimension of the bubble 70. The center circle is used particularly when the positioning device is attached to the "putter", thus enabling the golfer to be very precise with golf club alignment to achieve greater putting accuracy. An "X" or cross is located in centered relation within the circle 86 and provides for alignment of the spirit level with respect to the horizontal and vertical to aid in positioning the spirit level relative to the positioning head. The indicia further defines an outer circular line 88, being concentric with the inner circular line 86. The outer circle establishes a practical way for the golfer to establish the proper lie for the golf club, regardless whether it is a wood, long iron or short iron. When the positioning device is being employed for other than normal club alignment, the user will position the golf club so that the bubble 70 is controllably located relative to the inner and outer concentric circular lines 86 and 88. The bubble may be located equally between the lines or more toward respective ones of the lines in order to achieve selective positioning of the golf club. To further provide for controlled positioning of the golf club the indicia includes reference elements which provide the golfer with a visual reference of the desired position that has been achieved. Suitable positioning references may conveniently take the form of the letter "u", meaning up, and indicating that the toe of the golf club head is elevated above the heel. The letter "d" may be provided by the indicia to indicate that the heel of the club head is elevated above the toe. Thus when the golf club is positioned such that the bubble 70 is located more toward the "u" or "d", the club head will be improperly positioned for hitting the optimum straight golf shot, but may be suitably positioned to enable the golfer to perform a non-conventional, but desired golf shot. Additionally, the indicia may be provided with the letters "o" and "c" to the left and right of center respectively, which letters may be located between the inner and outer circular lines. The letter "o" is a reference for "open", meaning the striking face of the club head is not square with a normal intended line of flight to a target but, for a right hand golfer, means that the striking face is pivoted to the right, or clockwise, relative to the heel of the club head. This club head positioning will be used to cause the ball to curve to the right, typically called a "slice" or "fade". When the club head is oppositely pivoted to the left about the heel, for a right handed golfer, when the bubble 70 is located more toward the "u", the flight of the ball will likely be to the left so as to result in a "hook" or "draw". More experienced golfers use the draw or fade to achieve controlled landing of the ball at the target and to negotiate minor impediments such as trees, traps etc. which may be located close to the intended flight of the ball.

Immediately outside the outer circular line 88 the indicia provides three straight lines 90, 92 and 94 which are each oriented in intersecting relation with the center point 96 of the "X" or cross. Line 90 is defined as the center-line because it is located equidistantly between the left line 92 and the right line 94. These reference lines enable accurate positioning of the positioning device relative to the leading edge of the striking face of the golf club. First, the positioning device is assembled to the golf club with the mounting base of the positioning device loosely assembled to the shaft so that it can be moved by application of manual force, but sufficiently tightly secured to the shaft so that it will remain at any position to which it is moved. The golf club is then positioned its leading edge in aligned registry with a known vertical line. The position of the bubble 70 of the spirit level is then visualized in relation to the reference lines 90, 92 and 94. When the positioning device of the present invention is properly oriented relative to the golf club the bubble 70 will be located between the right and left reference lines 92 and 94 and the center reference line 90 will bisect the bubble. The mounting base will then be rotated on the shaft to the right or left by an amount sufficient to precisely position the bubble 70 relative to the right and left reference lines and to ensure that the bubble is precisely bisected by the center line 90. After this has been accomplished the mounting base bolts 28 and 30 will be tightened to secure the mounting base in immovable relation with the golf club shaft. After tightening the mounting base in this manner it will be wise to again check the accuracy of the positioning device in relation the leading edge of the club face to ensure that the mounting base did not become misaligned during its tightening.

A final step in setting up the golf club for training is the provision of handgrip markers 98 and 100 as shown in FIG. 2. These markers may be in the form of thin colored plastics material and may be adhesively attached to the hand grip at locations specified by a golf instructor. The user will place the thumb of each hand on the respective markers to ensure proper hand position when the golf club is brought into address with the ball. When the hand positions of the golfer are proper and when the golf club is properly oriented for the golf shot that is intended, it is very likely that the trajectory of the golf ball when struck with the golf club, will be precisely as intended. The present invention may be effectively employed for training or for actual play. If desired, the positioning head may be removed from the mounting base for actual play and can be temporarily replaced if the golfer feels the need to ascertain that the golf club is being accurately positioned relative to the ball. The positioning device of the present invention may be attached to any of the golf clubs that are being used by the golfer, including the putter, irons and woods. It is therefore seen that the present invention effectively attained all of the objects and advantages that are set forth above together with other objects and features that are inherent in the apparatus that is disclosed herein.

As will be readily apparent to those skilled in the art, the present invention may be produced in other specific forms without departing from its spirit scope and essential characteristics. The present embodiment is therefore to be considered as illustrative and not restrictive, the scope of this invention being defined by the claims rather that the foregoing description, and all changes which come within the meaning and embraced therein.

What is claimed is:

1. A positioning and position indicating device for releasable attachment to the shaft of a golf club having a head defining a reference edge, comprising:

(a) a mounting base adapted to be supported on a shaft of a golf club and having a mounting block defining a non-circular orienting receptacle therein and having a clamping block adapted for receiving the shaft of the golf club and retaining said mounting block in substantially immovable relation with the shaft of the golf club;

(b) a positioning head support being disposed in releasable and oriented assembly with said mounting base and having non-circular mounting means being received in oriented assembly by said non-circular orienting receptacle;

(c) a positioning head being connected to said positioning head support and being selectively positionable relative thereto:

(d) means retaining said non-circular mounting means in releasable, substantially immovable assembly within said non-circular orienting receptacle and supporting said positioning head support in substantially immovable relation with said mounting base;

(e) a generally circular spirit level being provided on said positioning head and being located for inspection by a golfer holding the golf club in position for addressing a golf ball lying on the ground for determination of the position at which the golf club is being held, said spirit level having a closed chamber with fluid therein and an a gas bubble present within said fluid; and (f) indicia means being present on said spirit level for orientation relative to said gas bubble at various positions of the golf club shaft, said indicia means having reference marks identifying up, down, open and closed positions of the reference edge of the head of the golf club when said golf club is positioned to address a golf ball.

2. The positioning and position indicating device of claim 1, wherein:

(a) said non-circular retainer element having a threaded extremity; and (b) said retaining means being a retainer element threadedly receiving said threaded extremity and securing said non-circular retainer element in said releasable, substantially immovable assembly with said mounting block.

3. The positioning and position indicating device of claim 2, wherein:

(a) said positioning head support defining a first pivot;

(b) said positioning head means having a second pivot being disposed in pivotal assembly with said first pivot and permitting selective pivotal orientation of said spirit level relative to said mounting base means.

4. The positioning and position indicating device of claim 1, wherein said indicia means comprising:

(a) a level reference for registry with said gas bubble when said reference edge of a golf club head is horizontally oriented and the golf club is positioned for address of a golf ball; and (b) a plurality of non-level references for registry with said gas bubble when the reference edge of a golf club head is oriented other than horizontal.

5. The positioning and position indicating device of claim 1, wherein said indicia means comprising:

golf club orienting reference means being orientable relative to said gas bubble when the reference edge of a golf club head is oriented vertically, for positioning of said mounting base means and positioning head means in relation with the reference edge of the golf club head.

6. The positioning and position indicating device of claim 5, wherein said golf club reference means comprising:

a center reference for bisecting registry with said gas bubble when said mounting base means and positioning head means in relation with the reference edge of the golf club head.

7. The positioning and position indicating device of claim 6, wherein said golf club orienting reference means further comprising:

a pair of lateral references being located in spaced relation on opposite sides of said center reference and being positioned for registry with respective side edges of said gas bubble when said mounting base means and positioning head means are oriented in relation to the reference edge of a golf club head.

8. The positioning and position indicating device of claim 5, wherein said golf club reference means comprising:

(a) a center reference for bisecting registry with said gas bubble when said mounting base means and positioning head means are oriented in relation to the reference edge of a golf club head; and (b) a pair of lateral references being located in spaced relation on opposite sides of said center reference and being positioned for registry with respective side edges of said gas bubble when said mounting base means and positioning head means are oriented in relation to the reference edge.

9. The positioning and position indicating device of claim 5, wherein said golf club reference means comprising:

at least one reference element being provided on said spirit level and being oriented in registry with said gas bubble when a golf club shaft is positioned substantially horizontally, thus permitting precise orientation of the hands of the golfer relative to the handgrip of the golf club.

10. The positioning and position indicating device of claim 9, wherein said golf club reference means comprising:

a center reference line and a pair of side reference lines being located in equidistantly spaced relation with said center reference line, and being positionable relative to the center and respective sides of said gas bubble when a golf club is positioned with the shaft thereof oriented substantially horizontally and when the reference edge of the golf club head is oriented substantially square with the intended line of flight of a golf ball when the golf club is positioned for address of a golf ball.

11. A positioning and position indicating device for releasable attachment to the shaft of a golf club having a golf club head defining a reference edge, comprising:

(a) a mounting block defining a recess for receiving a golf club shaft and having a non-circular orienting passage therein for orientation in substantially parallel relation with the golf club shaft;

(b) a clamping block defining a recess for receiving a golf club shaft;

(c) mounting elements for securing said mounting block and said clamping block in substantially immovable and releasable relation with a golf club shaft;

(d) a positioning head support having a non-circular orienting element extending in fixed relation therefrom and received within said non-circular orienting passage;

(e) means securing said non-circular orienting element in immovable and releasable assembly within said non-circular orienting passage;

(f) a positioning head being in positionable assembly with said positioning head support;

(g) a spirit level being supported by said positioning head in position for visual inspection by a golfer holding the golf club in position for striking a golf ball and having a liquid therein and a position indicating gas bubble within said liquid; and (h) reference indicia on said spirit level for reference with said gas bubble for indicating selected positions of the golf club in relation to the reference edge of the golf club head when the golf club is being held in position for striking a golf ball.

12. The positioning and position indicating device of claim 11, wherein:

(a) said positioning head support and said positioning head each defining pivot openings for pivotal registry; and (b) pivot means being received by said pivot openings and connecting said positioning head in pivotal assembly with said positioning head support, said pivot means being positionable to secure said positioning head in substantially immovable, selectively adjustable relation with said positioning head support.

13. The positioning and position indicating device of claim 12, wherein:

(a) said positioning head having spaced pivot tabs each defining said pivot openings;

(b) said positioning head support being received between said spaced pivot tabs; and (c) said pivot means being a pivot bolt extending through said pivot openings of said pivot tabs and said positioning head support and capable of being tightened to retain said positioning head in selectively positioned relation with said positioning head support.

14. The positioning and position indicating device of claim 11, wherein:

(a) said non-circular orienting element being a retainer pin having a threaded extremity; and (b) said securing means being a retainer nut receiving said threaded extremity and capable of being tightened to secure said retainer pin and said positioning head support in immovable relation with said mounting block.

15. The positioning and position indicating device of claim 11, wherein said positioning head comprising:

(a) a circular case defining a spirit level receptacle;

(b) a circular spirit level being received within said spirit level receptacle; and (c) means securing said spirit level in immovable relation within said spirit level receptacle.

16. The positioning and position indicating device of claim 15, wherein said securing means comprising:

(a) said circular case defining a split;

(b) retainer tabs projecting from said circular case on opposite side of said split; and (c) a retainer bolt extending through said retainer tabs and being tightened to close said split and establish frictional retention of said spirit level within said spirit level receptacle by said circular case.

* * * * *